(12) United States Patent
Woytassek et al.

(10) Patent No.: US 6,282,036 B1
(45) Date of Patent: Aug. 28, 2001

(54) ADJUSTABLE OPTICAL TRAIN

(75) Inventors: Mark A. Woytassek, Cedar Rapids; John A. Larison, Marion; Richard L. Robertson, Cedar Rapids, all of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/399,206

(22) Filed: Sep. 17, 1999

(51) Int. Cl.$^7$ .................................................. G02B 7/02
(52) U.S. Cl. .................... 359/822; 359/819; 359/438; 359/441; 359/442
(58) Field of Search .................................. 359/819, 822, 359/436, 438, 440, 441, 442

(56) References Cited

U.S. PATENT DOCUMENTS

| | | | |
|---|---|---|---|
| 2,651,235 | * 9/1953 | Barrows | 359/442 |
| 2,746,346 | * 5/1956 | Gaire | 359/442 |
| 3,163,940 | * 1/1965 | Geiser | 359/442 |
| 3,449,052 | * 6/1969 | Rankin | 359/438 |
| 4,316,330 | * 2/1982 | Hayes | 359/442 |
| 4,757,616 | * 7/1988 | Hills | 359/442 |
| 5,285,224 | * 2/1994 | Sims | 359/441 |
| 5,576,897 | * 11/1996 | Kuo | 359/822 |

* cited by examiner

Primary Examiner—Loha Ben
(74) Attorney, Agent, or Firm—Nathan O. Jensen; Kyle Eppele

(57) ABSTRACT

An assembly for providing an adjustable optical train is disclosed. An adjustable optical train is comprised of a plate having a channel formed therein. A submount suitable for mounting an object such as an optical component (e.g., holographic medium, lens, prism, etc.) engages the channel so the submount is suitable for slidable movement along the channel. In an exemplary embodiment, the submount further comprises a fastener. The fastener may include an appendage for engaging the channel and a holder coupled to the appendage. The holder is suitable for anchoring the appendage thereby securing the appendage to the channel thereby securing the submount to the plate.

20 Claims, 4 Drawing Sheets ary embodiment, the submount further comprises a fastener. The fastener may include an appendage for engaging the channel and a holder coupled to the appendage. The holder is suitable for anchoring the appendage to the channel thereby securing the submount to the plate. In an exemplary embodiment, the fastener is formed so as to be capable of being inserted into and removed from the channel along a plurality of points. In an additional exemplary embodiment, the fastener includes a spherical interface to further promote correct alignment.

ADJUSTABLE OPTICAL TRAIN

BACKGROUND OF THE INVENTION

The present invention relates generally to precision optical mounting devices commonly utilized in the fields of optics and holography, and more specifically to a mounting device providing an adjustable optical train for the mounting of an object, particularly an optical component such as a holographic medium, lens, prism, and the like.

Stability, adjustability and volume are important considerations in optical systems. Typically, a mounting system for optical components includes a surface such as an optical bench, optical table, or an optical breadboard that permits precise movement of one component relative to another. The surface is usually designed to minimize vibration of the components and to lessen inadvertent movement. In some instances, post holders are attached directly to the surface via holes drilled into the surface to support optical components. However, while somewhat stable, these posts are not easily moved to different points on an optical table.

One way of addressing this problem was to utilize magnetic posts to permit fine adjustment of the placement of optical components. However, magnetic posts do not offer the stability of the mechanically attached post systems and therefore are more susceptible to accidental movement and vibration.

Another way to address the problem involves optical rails that may be attached to an optical table or optical breadboard, with carriers attached to the rails to permit adjustment. At present, standard optical rails are ½ to 1 inch in height and are mounted on top of an optical table or an optical breadboard. A rail carrier is used to mount components to the optical rail. With the addition of optical mounts and adjustable height posts, a standard beam height of 6 to 8 inches may be obtained. While this height is acceptable in some applications, more precise applications, such as avionics equipment, require a lower height. Therefore, the flexibility of adjustment provided by an optical rail system is not presently available when a low beam height was desired. Additionally, in optical rail systems, precision and stability are sacrificed with the addition of each component required to mount an object, thereby magnifying the flaws of each mounting component with the addition of the next.

Further, changing and replacing components on a conventional optical train system required removing all the components mounted on the optical rail system. For example, if a user desired to remove a component surrounded by other components, the user had to remove the surrounding components to gain access to the desired component.

Consequently, there exists a need for a mounting device capable of providing an adjustable optical train. More specifically, there exists a need for a low-profile adjustable optical train with the ability to be adjusted for easy movement, capable of removing components in the optical train without removing other components and to accommodate optical design changes for an object, such as an optical component including a holographic medium, lens, prism, and the like within an optical system such as a holographic correlator, holographic memory, and the like.

SUMMARY OF THE INVENTION

Accordingly, the present invention is directed to a mounting device capable of providing an adjustable optical train. The mounting device is comprised of a plate having a channel formed therein. A submount suitable for mounting an object such as an optical component (e.g., holographic medium, lens, prism, etc.) engages the channel so as to provide slidable movement of the object along the channel.

In an exemplary embodiment, the submount further comprises a fastener. The fastener may include an appendage for engaging the channel and a holder coupled to the appendage. The holder is suitable for anchoring the appendage to the channel thereby securing the submount to the plate. In an exemplary embodiment, the fastener is formed so as to be capable of being inserted into and removed from the channel along a plurality of points. In an additional exemplary embodiment, the fastener includes a spherical interface to further promote correct alignment.

In an additional exemplary embodiment, the submount further comprises an aligning protrusion for aligning the submount with the channel. The submount may also include a connecting portion suitable for attaching a device to the submount.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DESCRIPTION OF THE PREFERRED EMBODIMENT

Reference will now be made in detail to the presently preferred embodiments of the invention, examples of which are illustrated in the accompanying drawings.

Referring now to FIGS. 1 through 7 in general, adjustable optical trains in accordance with exemplary embodiments of the present invention are shown. In each embodiment, the adjustable optical train provides precise movement of one component relative to another. The adjustable optical train may include a plate, such as an optical bench, optical table, optical breadboard, and the like that acts as a support for a component to provide a stable and adjustable mount. Plates may include longitudinal plates to permit precise longitudinal movement and a two-dimensional plate to permit precise movement in two dimensions, with the addition of mounts of differing heights, three dimensional movement may also be obtained. Preferably, the plate acts as a stable surface both to minimize vibrations and to supply a uniform surface. For example, the plate may act as a mount for moving components both in relation to each other and to the plate. Such components may include optical components including lens, prisms, mirrors, periscopes, lamps, apertures, eyepieces, ground glass, and the like.

Figure 1:
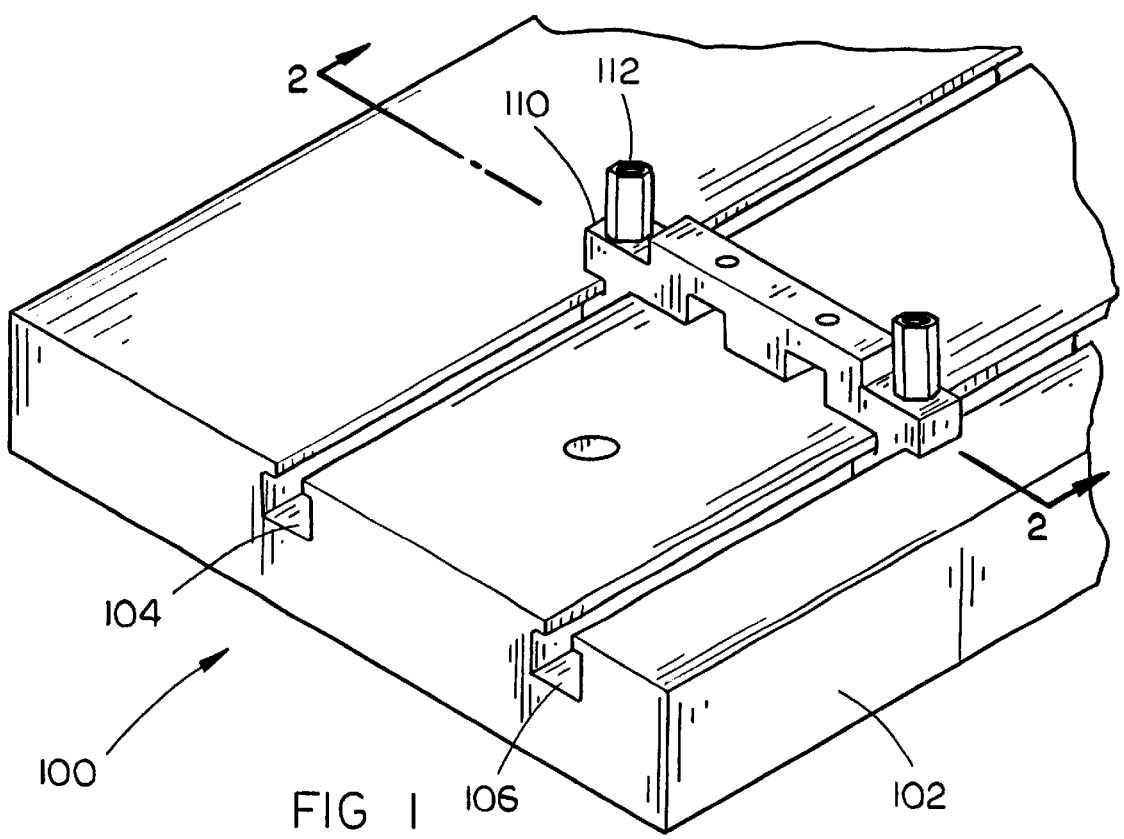
FIG. 1 is an isometric view of an exemplary embodiment of the present invention wherein an adjustable optical train includes a plate and a submount.

Referring now to FIG. 1, an exemplary embodiment of the present invention is shown. An adjustable optical train 100 includes a plate 102 for providing a stable surface allowing precise movement of one component relative to another. The plate 102 may include a first channel 104 and a second channel 106 formed therein. A submount 110 engages the channels 104, 106 so as to enable slidable movement of the submount 110 along the channels 104, 106. The submount 110 provides an interface for mounting a component to the plate 102. A fastener 112 may also be provided to secure the submount 110 to the plate 102. Therefore, the channels 104, 106 and submount 110 provide a low profile optical train, which in turn reduces the overall equipment volume. Therefore, the flexibility of an optical train is achieved with lowered height characteristics and a reduction in the amount of components required, adding to the stability of the mount.

Figure 2:
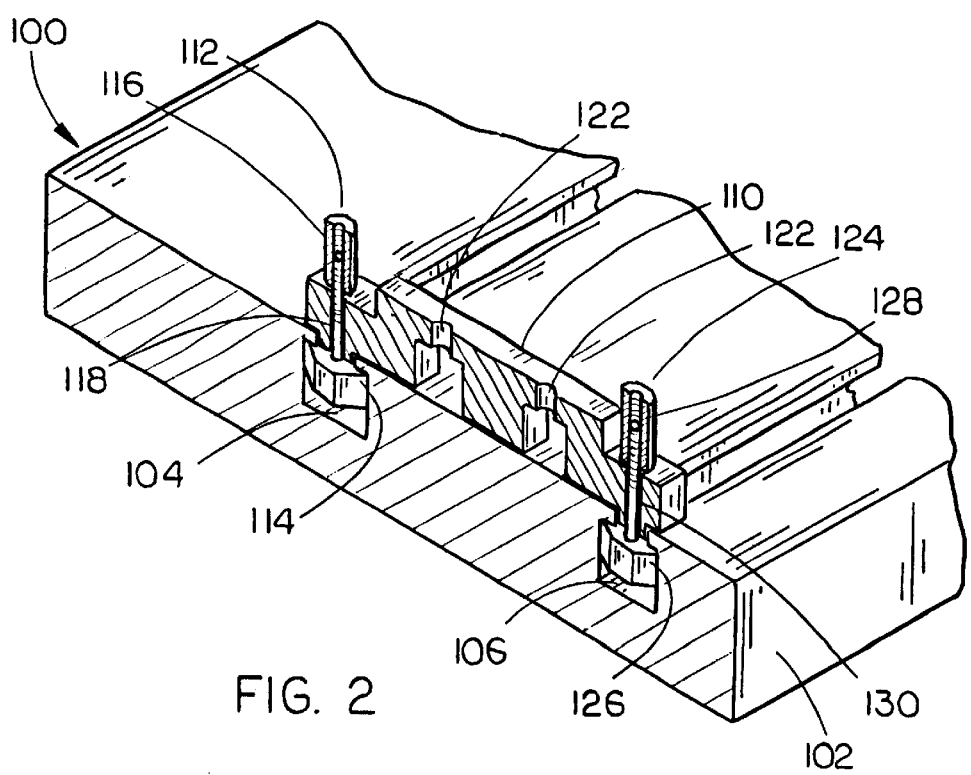
FIG. 2 is a cross-sectional view of an exemplary embodiment of the present invention as shown in FIG. 1, wherein a submount suitable for engaging a plate is shown.

Referring now to FIG. 2, a cross-sectional illustration of the adjustable optical train of FIG. 1 is shown. The adjustable optical train 100 includes a plate 102 to provide a surface for mounting components. In this embodiment, a first channel 104 and a second channel 106 are formed as a part of the plate 102 to decrease the profile of the adjustable optical train 100. The submount 110 engages the first channel 104 and the second channel 106 so that the submount 110 may slide therein. A fastener 112 may be provided to secure the submount 110 to the plate 102 to prevent movement along the first channel 104. The fastener 112 may include an appendage 114 suitable for engaging the first channel 104. A holder 116 is coupled to the appendage 114 to anchor the appendage 114 to the first channel 104 thereby securing the submount 110 to the plate 102. The appendage 114 may pass through an opening 118 in the submount 110 to enable adjustment of the appendage 114 by the holder 116. The submount 110 may include a connecting portion 122 for mounting components to the submount 110. Components may be mounted to the connecting portion 122 in a variety of ways, including the use of magnetic and mechanical devices such as screws, rivets, bolts and nuts, and the like.

In a preferred embodiment, the submount 110 includes a second fastener 124 installed at the opposite end of the submount 110 from the first fastener 112 to provide additional stability to the adjustable optical train 100. The second fastener 124 may include an appendage 126 suitable for engaging the second channel 106. A holder 128 may be coupled to the appendage 126 to anchor the appendage 126 to the second channel 106 thereby securing the submount 110 to the plate 102. In this way, the submount 110 is secured to the plate 102 at two places 112 and 124, thereby eliminating inadvertent twisting of the submount 110 with respect to the desired alignment. The appendage 126 may pass through an opening 130 in the submount 110 to enable adjustment of the appendage 126 by the holder 128.

Figure 3:
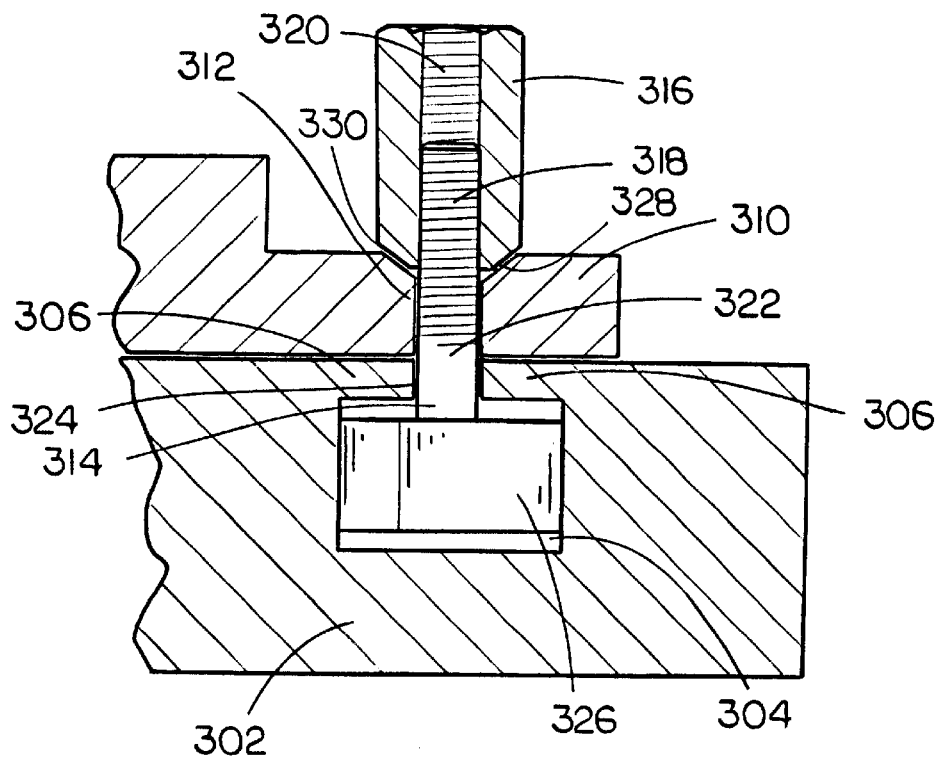
FIG. 3 is a cross-sectional view of an exemplary embodiment of the present invention depicting a fastener capable of being utilized by the present invention.

Referring now to FIG. 3, an enlarged cross-sectional illustration of an exemplary fastener is shown. In this embodiment, the plate 302 of the adjustable optical train includes a channel 304 formed therein. The channel 304 includes an extending portion 306 to permit a fastener 312 to engage the channel 304. The fastener 312 may include an appendage 314, in this instance including a channel engagement head 326, to engage the channel 304 thereby securing the submount 310 to the plate 302. The appendage 314 is adjusted with the use of a holder 316. The holder 316 receives the appendage 314 with the use of threads 318 on the outside surface of the shaft 322 coupled to threads 320 disposed on the inside surface of the holder 316. As the holder 316 is rotated, the appendage 314 may be raised and lowered to secure the submount 310 to the plate 302.

Alignment is an additional concern to the efficient utilization of components. Precise alignment of one component with another component increases the efficiency of the overall system. To increase the precision of the alignment of the system, it is desirable to limit the unwanted movement of the submount with respect to the plate. For example, to decrease the lateral movement of the submount 110 with respect to a longitudinal first channel 104 as shown in FIG. 1, the width of the shaft 322 of the appendage 314 may closely correspond to the space 324 between the extending portions 306 of the channel 304. Similarly, a channel engagement head 326 included as a part of the appendage 314 may have a size corresponding with the size of the channel 304 thereby restricting movement. In this way, the lateral movement of the submount 310 may be restricted while permitting movement of the submount 310 along the channel 304 and the insertion and removal of the submount 310 from a plurality of points along the channel 304.

Another way of furthering the precise alignment of the optical system may include using a spherical interface so as to align the submount, fastener and channel. In an exemplary embodiment, a spherical indentation 328 disposed on the submount 310 receives a complementary spherical surface 330 disposed on the holder 316. In this way, as the holder 316 is rotated to fasten the appendage 314 to the channel 304, the spherical indentation 328 receives the spherical surface 330 of the holder 316 thereby aligning and securing the appendage 314 with respect to both the submount 310 and the plate 302.

Figure 4:
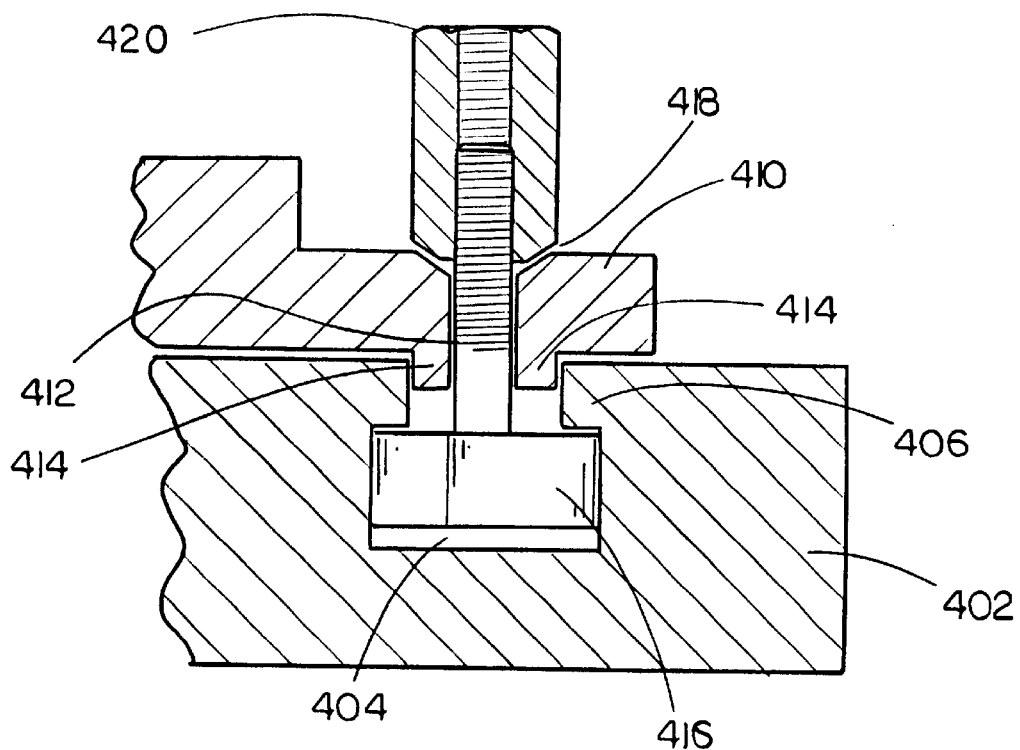
FIG. 4 is a cross-sectional view of an exemplary embodiment of the present invention depicting a submount including an aligning protrusion.

The submount may also utilize an aligning protrusion to promote precise alignment of the submount with the plate and thereby the correct alignment of the adjustable optical train and the components themselves, as shown in FIG. 4. In this embodiment, the fastener 420 operates in substantially the same manner as described in the discussion of FIG. 3. A plate 402 includes a channel 404 formed therein. The channel 404 includes an extending portion 406 to permit an appendage 412 including a channel engagement head 416 to engage the channel 404 thereby securing the submount 410 to the plate 402. The submount 410 includes an aligning protrusion 414 that engages the channel 404 to restrict unwanted lateral movement of the submount 410. Preferably, the aligning protrusion 414 is formed with a sufficiently high tolerance with respect to the dimensions of the channel 404 so as to restrict lateral movement of the submount. Further, a spherical interface 418 may be included to promote precise mounting of the submount 410 to the channel 404. In this way, precise longitudinal adjustments may be made by the optical train while minimizing lateral discrepancies.

Figure 5:
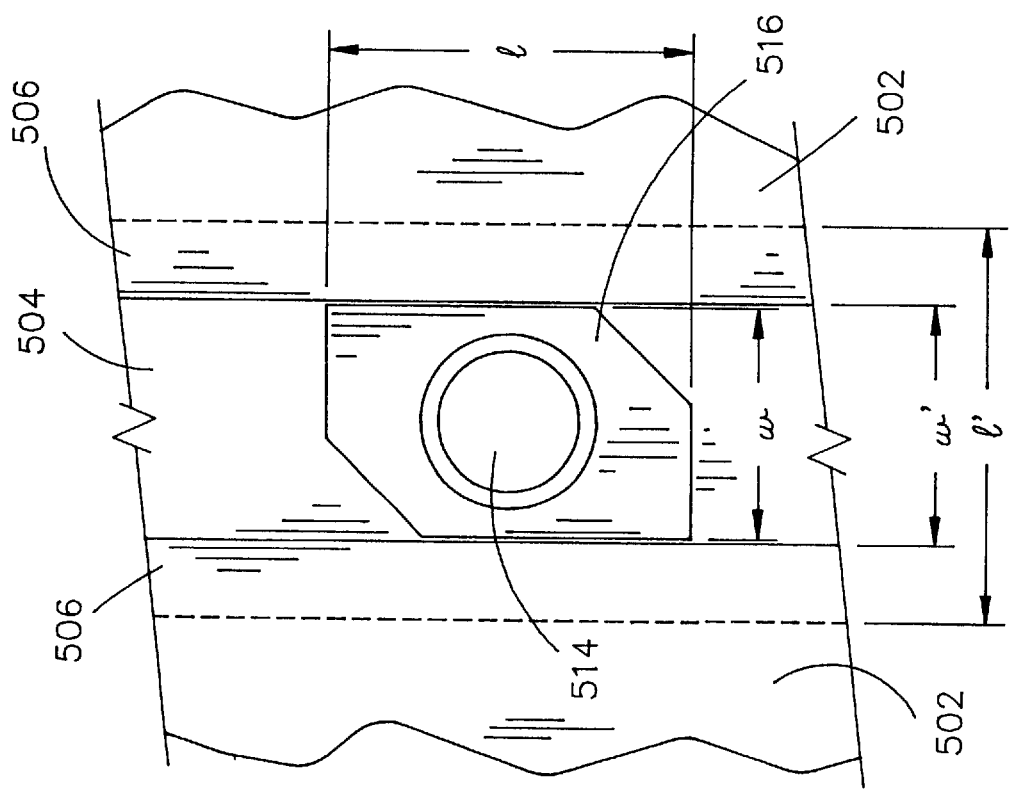
FIG. 5 is a top view of an exemplary embodiment of the present invention depicting a fastener capable of removable mounting along a plurality of points along a channel to a plate.

Referring now to FIG. 5, an exemplary embodiment is shown wherein a fastener is formed so as to enable removable mounting of an adjustable optical train. A plate 502 including a channel 504 formed with extending portions 506 permit an appendage 514 including a channel engagement head 516 to engage the channel 504. It may be preferable to form the channel engagement head 516 in a variable shape so as to permit insertion of the channel engagement head 516 through a gap formed between the extending portions 506 of the channel 504, yet still enable the channel engagement head 516 to engage the channel 504. For example, the channel engagement head 516 may be formed in a variable shape so as to have a width (w) corresponding to the width (w') of the gap formed by the extending portions 506 of the channel 504 and a length (l) sufficient to enable the channel engagement head 516 to engage the channel 504 and extending portions. For instance, the channel engagement head 516 is formed of a sufficient length (l) to engage the channel 504 when the submount 110 (FIG. 1) is secured to the plate 102 (FIG. 1). In another example, the width (w) of the channel engagement head 516 is less than the width (w') of the gap between the extending portions 506 to permit the insertion of the channel engagement head 516 through the gap. Additionally, the length (l) of the channel engagement head 516 is greater than the width (w') of the gap so as to enable the channel engagement head 516 to be secured to the extending portions 506 of the plate 502. It may also be preferable to form the channel engagement head 516 of at least a minimum length (l') to contact the channel 504 to prevent spinning of the channel engagement head 516 as it is fastened to the plate 502, thereby facilitating the installation and removal of the submount 110 (FIG. 1) from the plate 102 (FIG. 1) and providing an additional securing force.

Figure 6:
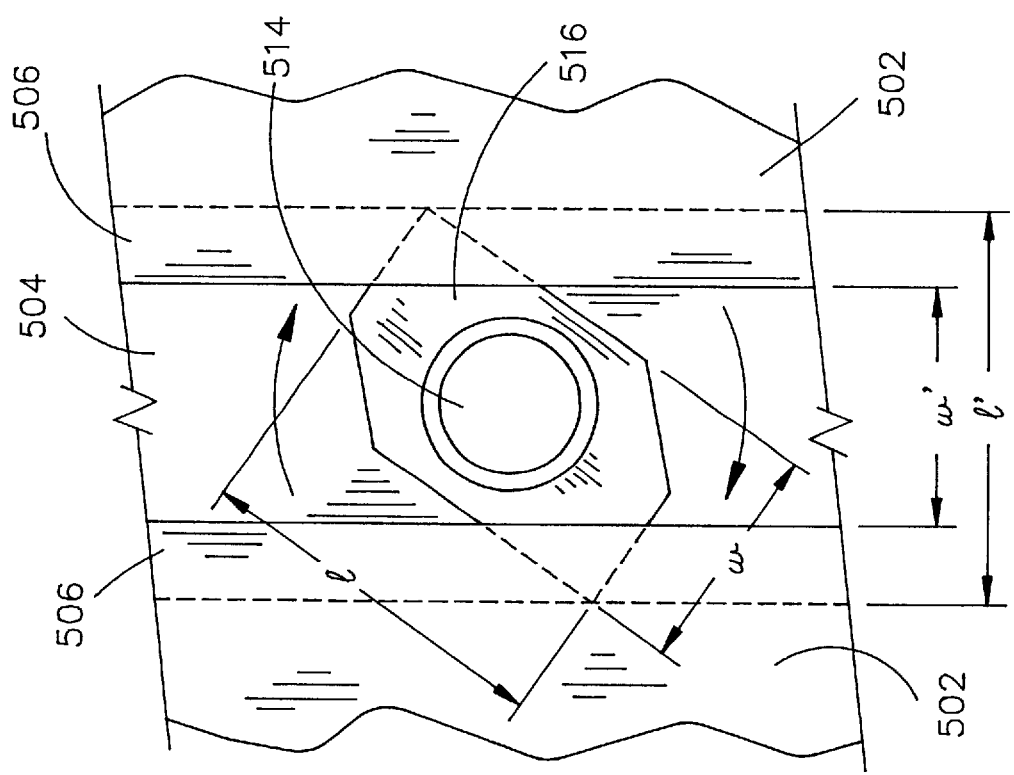
FIG. 6 is a top view of the exemplary embodiment as shown in FIG. 5, wherein the fastener is disposed in a securing orientation.

Therefore, a user desiring to install and remove a submount 110 (FIG. 1) from a plate 102 (FIG. 1) in an adjustable optical train 100 (FIG. 1) merely has to align the width (w) of the channel engagement head 516 between the extending portions 506 of the channel 504 to permit the channel engagement head 516 to pass through the gap formed between the extending portions 506 of the channel 504. To mount the submount 110 (FIG. 1), the appendage 514 may be rotated, such as by using the holder 116 (FIG. 2), thereby causing the channel engagement head 516 to rotate and consequently contact the channel 504 surface and extensions 506 or both to fasten the submount 110 (FIG. 1) to the plate 502, as shown in FIG. 6. It should be apparent that although the shape of an exemplary fastener has been described, alteration of the shape while performing the function described is contemplated, and that various changes may be made in the form, construction and arrangement of the components thereof without departing from the spirit and scope of the present invention.

Figure 7:
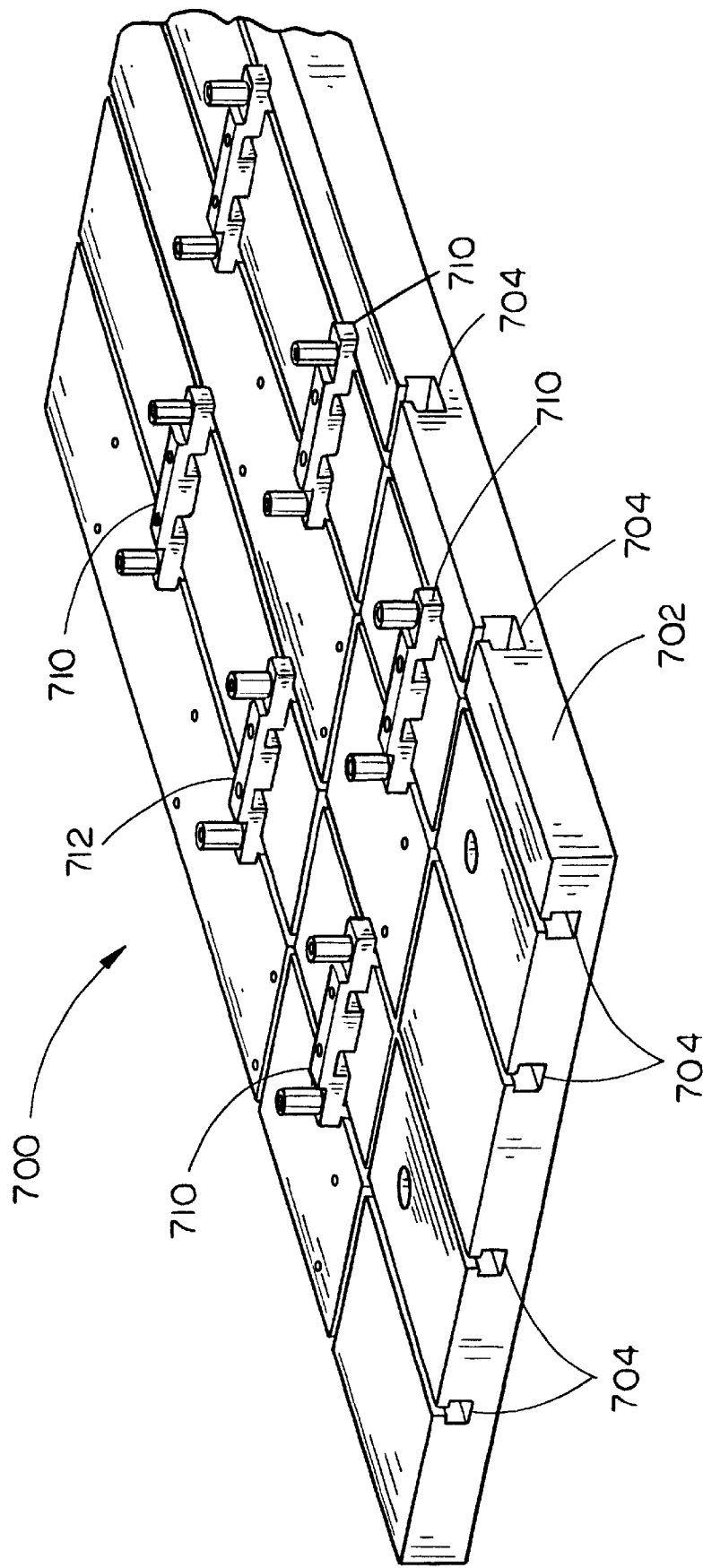
FIG. 7 is an isometric view of an additional exemplary embodiment of the present invention wherein a plurality of channels utilized in varying orientations is shown.

In an exemplary embodiment forming the fastener in a variable shape allows submounts to be installed and removed at a plurality of points along the channels without disturbing other submounts mounted to the plate, as shown in FIG. 7. For example, a submount 712 is capable of being removed at a plurality of points along the channels 704 without disturbing other submounts 710 secured to the channels 704.

Additionally, a variety of channels may be utilized by an adjustable optical train 700 and not depart from the spirit and scope of the present invention. For example, linear channels may be utilized on a plate 702 disposed at a variety of angles to mount a plurality of submounts 710. As shown in FIG. 7, channels may be disposed in a parallel and perpendicular fashion. It is also contemplated that any other orientation of a channel with respect to another channel may be utilized and not depart from the spirit and scope of the present invention. Furthermore, non linear channels may also be utilized by the present invention, such as curved, segmented, angular, and the like as contemplated by a person of ordinary skill in the art.

It is believed that the adjustable optical train of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A mounting device for providing an adjustable optical train, comprising:
   a plate having a plurality of channels formed therein;
   a submount suitable for mounting an object wherein said submount engages a pair of channels in the plurality of channels so said submount is suitable for slidable movement along said pair of channels; and
   a fastener located at each end of said submount for securing said submount to said plate, wherein the fastener is formed so as to be capable of being inserted into and removed from a channel along a plurality of points.

2. The mounting device as recited in claim 1, wherein said plate further has a plurality of parallel and perpendicular channels.

3. The mounting device as recited in claim 1, wherein said fastener further comprises:
   an appendage suitable for engaging said channel;
   a holder coupled to said appendage;
   wherein said holder is suitable for anchoring said appendage to said channel thereby securing said submount to said plate.

4. The mounting device as recited in claim 3, wherein said appendage includes a channel engagement head wherein the channel engagement head has a variable shape capable of being at least one of inserted into and removed from a plurality of points along said channel.

5. The mounting device as recited in claim 4, wherein said submount further comprises a connecting portion suitable for attaching a device to said submount.

6. The mounting device as recited in claim 1, wherein said submount further comprises an aligning protrusion capable of engaging the channel thereby restricting lateral movement of said submount.

7. The mounting device as recited in claim 1, wherein said channel comprises an extending portion.

8. A mounting device for providing an adjustable optical train, comprising:
   a plate having a channel formed therein;
   a submount said submount suitable for mounting an object; and
   a fastener located on said submount for securing said submount to said plate;
   wherein said submount engages said channel so said submount is suitable for slidable movement along said channel and said fastener is formed so as to be capable of being inserted into and removed from the channel along a plurality of points.

9. The mounting device as recited in claim 8 further comprising a second fastener located at an opposite end from the first fastener on said submount, said plate having a second channel, and said second fastener formed so as to be capable of being inserted into and removed from the second channel along a plurality of points.

10. The mounting device as recited in claim 8, wherein said fastener further comprises:

an appendage suitable for engaging said channel; and a holder coupled to said appendage;

wherein said holder is suitable for anchoring said appendage to said channel thereby securing said submount to said plate.

11. The mounting device as recited in claim 10, wherein said appendage includes a channel engagement head wherein the channel engagement head has a variable shape capable of being at least one of inserted into and removed from a plurality of points along said channel.

12. The mounting device as recited in claim 8, wherein said submount further comprises an aligning protrusion capable of engaging the channel thereby restricting lateral movement of said submount.

13. The mounting device as recited in claim 8, wherein said submount further comprises a connecting portion suitable for attaching a device to said submount.

14. The mounting device as recited in claim 8, wherein said channel comprises an extending portion.

15. A mounting device for providing an adjustable optical train, comprising:

a plate having a plurality of channels formed therein; and a plurality of submounts for mounting optical components in said plurality of channels;

wherein said plurality of submounts engage said plurality of channels so said plurality of submounts are suitable for slidable movement along said plurality of channels and said submounts being capable of being inserted into and removed from said channels along a plurality of points without disturbing other submounts.

16. The mounting device as recited in claim 15, wherein said plurality of submounts further comprise fasteners for mounting said submounts to said channels.

17. The mounting device as recited in claim 16, wherein said fasteners are formed so as to be capable of being inserted into and removed from said channels along a plurality of points.

18. The mounting device as recited in claim 16, wherein said fasteners further comprise:

appendages suitable for engaging said channels; and holders coupled to said appendages;

wherein said holders are suitable for anchoring said appendages thereby securing said appendages to said channels thereby securing said submounts to said plate.

19. The mounting device as recited in claim 15, wherein said submounts further comprise connecting portions for attaching the optical components to said submounts and aligning portions for aligning said submounts with said channels.

20. The mounting device as recited in claim 15, wherein said plate has a plurality of parallel and perpendicular channels.

* * * * *